Sept. 24. 1940. S. D. BROWNLEE ET AL Re. 21,577

FLATIRON

Original Filed June 20, 1938 2 Sheets-Sheet 1

Stuart D. Brownlee
John G. Macdonald
INVENTORS

Alex. E. MacRae
ATTORNEY

FLATIRON

Original Filed June 20, 1938 2 Sheets-Sheet 2

Stuart D. Brownlee
John G. Macdonald.
INVENTORS

Alex. E. Mackat
ATTORNEY

Reissued Sept. 24, 1940

Re. 21,577

UNITED STATES PATENT OFFICE 21,577

FLATIRON

Stuart D. Brownlee and John G. Macdonald,
Toronto, Ontario, Canada

Original No. 2,174,359, dated September 26, 1939, Serial No. 214,644, June 20, 1938. Application for reissue June 1, 1940, Serial No. 338,428. In Canada June 23, 1937

20 Claims. (Cl. 219—25)

Our invention relates to electrical connecting devices for portable utensils and particularly to an arrangement for connecting the customary flexible cord to flatirons.

In electrical flatirons it is customary to connect the cord to the rear of the iron whereby the heating element may be energized during operation. The frequent bending of the cord during the operation of hand ironing causes the electrical conductor to weaken at one point and eventually break. The difficulty has been alleviated to some extent by the provision of a coiled spring surrounding the wire at its point of entrance to the iron, but the objection has not been entirely overcome as the cord tends to have a sharp bend at the point where it leaves the spring. It is common also in electric hand irons to provide rests on the back of the iron whereby the iron may be stood on its end when not in use. This further aggravates the trouble indicated above as the relatively short bend to which the cord is subjected when the iron is placed in this position tends to eventually break the conductors.

It is the object of our invention to provide an electrical flatiron having a cord connecting arrangement which is sturdy and compact and which obviates the above defects permitting the iron to be easily operated by the hand or stood on its rear supports or rests without subjecting the cord to destructive short bends.

Our invention also comprises various features of novelty and combinations of parts all of which will become apparent from a consideration of the following description taken together with the drawings in which the same reference character refers to the same part through the several views. In the drawings Fig. 1 is a perspective view of a flatiron in accordance with our invention;

Figure 1:
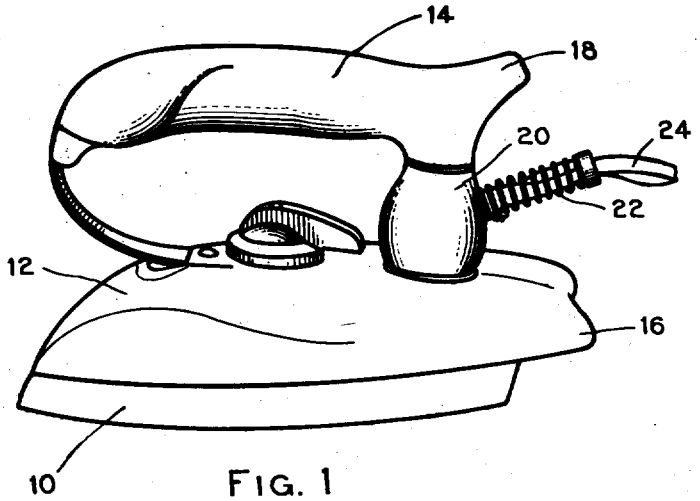
Figure 2:
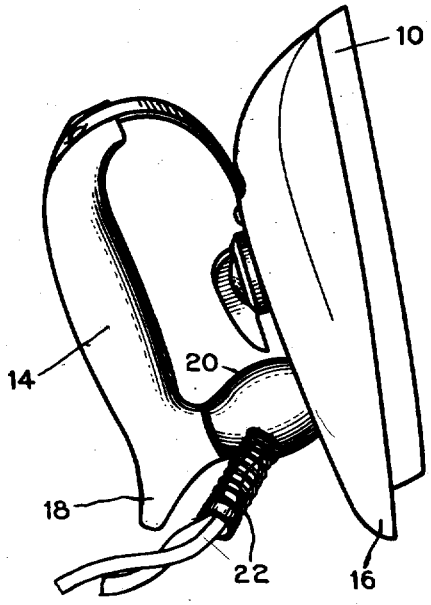
Fig. 2 is a perspective view in another position.
Figure 3:
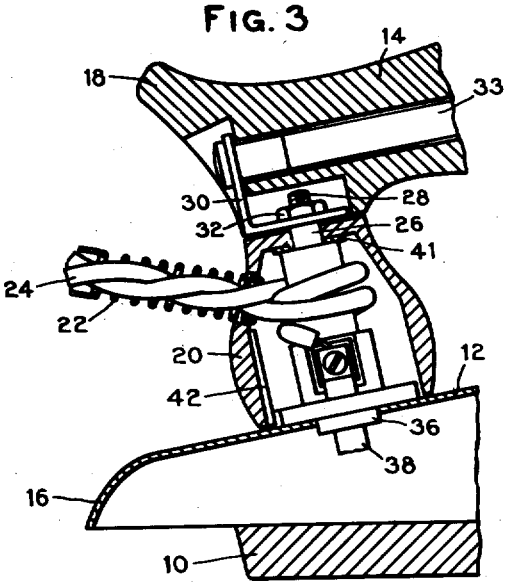
Fig. 3 is a central longitudinal section through the rear part of an iron.
Figure 4:
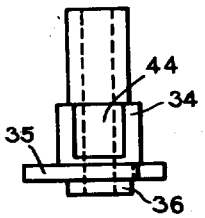
Fig. 4 is a view of the terminal block employed.
Figure 5:
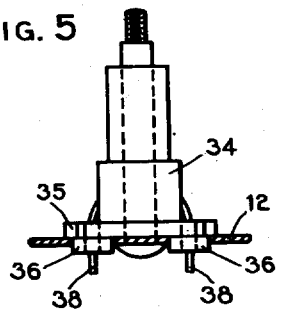
Fig. 5 is a view of the terminal block at right angles to Fig. 4.
Figure 7:
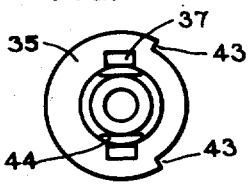
Fig. 7 is a top plan view.
Figure 6:
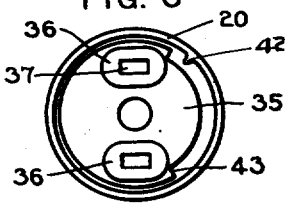
Fig. 6 is a bottom plan view of the block.

Referring to the drawings, particularly Figs. 1 and 2, 10 represents a flatiron soleplate, 12 is a cover shell which is detachably secured to the soleplate and 14 is a handle secured to the shell. The rear end of the cover shell 12 projects beyond the soleplate as shown at 16 and this projection, together with the projection 18 at the rear of the handle are adapted to act as a rest whereby the iron may be placed in the position shown in Fig. 2 with the soleplate out of contact with the supporting surface. A hollow cylindrical shell 20 is mounted on the rear handle supporting post whereby it may oscillate freely through an arc of about 90° and about an axis which is substantially vertical or extends lengthwise of the rear handle support. The shell 20 is provided with a flexible cord protector or cord spring 22 of the customary type through which the flexible conductor 24 enters the shell where it is connected to terminals.

Referring to Fig. 1 which shows the iron in operating position it will be seen that when the iron is twisted and moved erratically as is customary in applying it to the work at hand that these movements are not transmitted to the flexible cord outside of the shell. The freely oscillatable mounting of the shell permits it to remain practically stationary due to the drag of the cord during the erratic movement of the iron. The iron during the ironing operation may oscillate or move laterally within the limits of the relative pivoting movements, without the pull or drag of the cord being exerted upon the iron. When the iron is turned up on its rest 16 as shown in Fig. 2 the first part of the assembly to make contact with the supporting surface will be the end of the spring 22 which will cause the shell 20 to rotate either one way or the other out of the way and permit the projection 18 to rest on the surface. The cord is thus not forced to make a sharp bend but bends in a wide angle as shown in Fig. 2. It will be obvious also that the arrangement is equally suited for either a right handed or a left handed person.

Referring now to Figs. 3 to 7 for constructional details of the swivel cord connection generally shown in Figs. 1 and 2. A supporting post 26 is rigidly secured at its lower end to the cover shell 12. This post acts as a rear support for the handle and also acts to carry the parts of the swivel connection. The upper end of the post is reduced as at 28, providing a shoulder, and the reduced portion is threaded. To support the handle, a bracket 30 is clamped against the shoulder by a nut 32 engaging the threaded portion. The rear end of the handle 14 is secured to the bracket by a handle bolt 33, which extends lengthwise therethrough. A terminal block 34 of insulating material capable of withstanding the heat to which the iron is subjected, for example, steatite, is provided with a central bore whereby it is mounted on the post 26. The terminal block is provided with a disc-shaped base 35, from the lower side of which projects a pair of bosses 36. When the terminal block is applied to the post the bosses project through a pair of openings in the cover shell 12, one on each side of the post, and prevent rotary movement of the block on the post. Holes 37 are provided through the bosses, whereby leads 38 from the heating element (not shown) pass through the cover shell 12 and are insulated therefrom. A hollow shell 20 of generally cylindrical shape and closed at its upper end, is rotatably mounted on the post 26 by means of a central opening in its closed end. A washer 41 is provided between the closed end of the hollow shell 20 and the upper end of the terminal block. The lower end of the shell 20 surrounds the disc-shaped base 35 of the terminal block, but has a loose fit therewith. The proportions of the parts are such that the shell 20 does not bear on the cover shell 12 and the upper end is not clamped by the bracket 30, whereby free rotation of the shell 20 on the post 26 is provided for. The angular amount by which the shell 20 may rotate on the post 34 is limited by the provision of cooperating parts on the interior of the shell and the base 35. The cooperating parts consist of a rib 42 on the interior of the shell 20, which operates between the stops in the base 35, provided by cutting an accurate section from its edge. Spring 22 is fastened in a hole provided in the hollow shell 20.

In assembling the parts the terminal block 34 is placed on the post 26 with the bosses 36 projecting into the cooperating openings in the shell and with the current leads 38 through the openings in the bosses, with their ends located in recesses 44 of the block. The hollow shell 20 with the cord spring 22 attached is then threaded on the flexible cord 24. The individual insulated conductors of the flexible cord are then wrapped around the upper part of the terminal block 34 as indicated, and the ends secured to the current leads 38 with square nuts, cup washers and screws. The swivel washer 41 is then applied on the post 26 and rests on the top of the terminal block 34. The swivel shell 20 is then applied to the post 26 with its internal rib 42 occupying the notched out portion of the base. The bracket 30 is then applied to the reduced portion of the upper end of the post and is secured in position by the nut 32. The handle is then applied by means of its bolt 33.

The swivel shell 20 with its attached cord spring carrying the flexible conductors can freely rotate about the supporting post and terminal block between the limiting positions provided by the rib 42 and the notched out portion of the base 35. The parts are so located that the shell can oscillate through an angle of about 90° and about 45° on each side of the central longitudinal axis of the iron. The wrapping of the individual insulated conductors about the upper end of the terminal block provides a strain relief and permits the oscillation of the shell 20 as described. While we have shown the terminal blocks with an upper cylindrical portion, providing an insulating sleeve above the upper part of the post as a unitary structure, it is obvious that the upper cylindrical portion, constituting a cylindrical insulating and spacing sleeve, may be a separate part from the terminal block, if desired.

While we have shown in detail a specific constructional embodiment of our invention, it is understood that we are not restricted thereto, but aim to include within the scope of the appended claims all modifications falling within the scope of our invention. The term "body" as used in the claims includes the sole plate 10 and the cover shell 12.

What we claim as new and desire to secure by Letters Patent of the United States is:

1. In an electric appliance having a body and a handle spaced from said body, a post projecting upwardly from said body and supporting one end of said handle, a terminal block of insulating material mounted on said post, terminal means mounted on said terminal block, a shell extending between said handle and said body surrounding said terminal block and pivotally mounted on said post, said shell being provided with an opening to receive and support supply conductors secured to said terminal means, said shell pivoting about said post to absorb pulls on said conductors.

2. In an electric appliance having a body and a handle spaced from said body, a post rigidly secured to and projecting upward from said body and supporting one end of said handle, a terminal block of insulating material non-rotatably mounted on said post, terminal means mounted on said block and internally connected in said body, a shell extending between said handle and said body surrounding said terminal block and pivotally mounted on said post, said shell being provided with an opening to receive and support current supply conductors secured to said terminal means, said shell pivoting about said post to absorb pulls on said conductors.

3. In an electric appliance having a body and a handle spaced from said body, a post secured to and projecting upward from said body and supporting one end of said handle, a terminal block of insulating material having a central bore to receive said post, said terminal block having a pair of bosses provided with openings projecting from the lower base thereof passing through openings provided in said body, terminal means mounted on said block and passing through the openings in said bosses to the interior of said body, a shell surrounding said terminal block and pivotally mounted on said post, said shell being provided with an opening to receive conductors secured to said terminal means, said shell pivoting about said post to absorb pulls on said conductors.

4. In an electric appliance having a body and a handle spaced from said body, said body provided with projections cooperating with said handle to provide an inoperative resting position, a rigid post projecting between said body and said handle, a terminal block non-rotatably mounted on said post, terminal means for said appliance mounted on said block, a shell of insulating material surrounding said terminal block and mounted thereon for free oscillation about said post as an axis, said shell provided with an opening to receive and support supply conductors connected within said shell to said terminal means, means causing rotation of said shell when said appliance is moved to said inoperative resting position whereby said supply conductors are protected against sharp bends.

5. In an electric appliance having a body and a handle spaced from said body, the one end of said body provided with projections cooperating with the corresponding end of said handle to form a stand for said appliance, a shell of insulating material rotatably mounted between said handle and said body, said shell enclosing terminal means for said appliance and provided with an opening to receive and support current conductors connected to said terminal means, a coiled spring surrounding said conductors and projecting from said opening in said shell whereby said coiled spring protects said conductors against sharp bends by causing rotation of said shell when the appliance is placed on said stand.

6. In an electric flatiron, a soleplate provided with a heating element having terminals, a cover shell secured to the soleplate, a rigid post projecting above said shell, a terminal block non-rotatably mounted about said post, said terminals projecting into said terminal block, a hollow member enclosing said terminal block and mounted for free oscillation about said post, current conductors passing through the wall of said hollow member, secured by strain relieving means and connected to said terminals in said terminal block.

7. The construction claimed in claim 6, whereby said strain relieving means is provided by winding said conductors about said terminal block before connecting to said terminals.

8. In an electric flatiron, a soleplate provided with a heating element having terminals, a cover shell secured to said soleplate, a terminal block non-rotatably mounted above said cover shell, a hollow member enclosing said terminal block, said member provided with a current conductor receiving opening therein, a coiled spring mounted in said opening, and said hollow member mounted for free oscillation about said terminal block.

9. In an electric appliance having a body and a handle spaced from said body, a post secured to said body and supporting one end of said handle, a terminal block of insulating material non-rotatively mounted on said post between said body and said handle, terminal means projecting from said body and supported by said terminal block, a shell of insulating material surrounding said terminal block and mounted thereon for free oscillation about said post as an axis, a coiled spring mounted in and projecting from an opening in said shell, electric supply conductors for said appliance passing through said coiled spring to the interior of said shell, said conductors being held by strain relieving means within said shell and fastened to said terminal means on said terminal block.

10. In an electric flatiron having a body and a handle spaced from said body, a post secured to and projecting upwardly from said body and supporting one end of said handle, projections on said body forming in cooperation with said handle an inoperative resting position for said flatiron, a terminal block of insulating material non-rotatively mounted on said post, terminal means for said flatiron mounted on said terminal block, a shell of insulating material surrounding said terminal block and pivotally mounted on said post, said shell being provided with an opening to receive supply conductors secured within the shell to said terminal means, a coiled spring surrounding said conductors and mounted with one end thereof projecting from the opening in said shell whereby, when said flatiron is placed in inoperative position on a surface, the projecting end of said spring contacts the said surface and causes said shell to pivot about said post as an axis and prevent sharp bending of said conductors.

11. In an electric flatiron having a body and a handle spaced from said body, a post secured to and projecting upwardly from said body, a terminal block of insulating material non-rotatively mounted on said post, terminal means projecting from said body and mounted on said terminal block, a shell of insulating material surrounding said terminal block and mounted thereon for rotation about said post as an axis, said rotation limited by stops, an opening provided in said shell to receive and support supply conductors connected within said shell to said terminal means, the upper end of said post provided with an angular bracket removably fastened thereto, said bracket cooperating with a bolt passing through said handle, whereby said handle is supported independently of said rotating shell and said shell is free to rotate within the limits set by said stops.

12. The construction as claimed in claim 11, whereby the said limiting stops comprise cooperating means mounted on said shell and on a fixed part of said flatiron to restrict pivoting of said shell within a limited angle on each side of the central longitudinal axis of said flatiron.

13. A flatiron having a body and a handle spaced from said body, a rigid post connecting said body and said handle, a hollow shell extending between said body and said handle, said shell provided with an opening therein whereby it is pivotally mounted on said post, cooperating stops mounted on said shell and on a fixed part of said flatiron to limit pivoting of said shell, supply conductors connected to terminal means in said flatiron and extending through an opening in the side wall of said shell for engagement with a supply circuit, whereby in the operation of ironing, the said shell, restricted by the drag of the conductors and freely pivoting about said post, thereby minimizes destructive bending of said conductors.

14. In an electric appliance having a body and a handle mounted upon said body, one end of said body being provided with projections co-operating with the corresponding end of said handle to form a stand for said appliance, electric terminal means disposed within said appliance, and current conductors extending into the appliance and connected with said terminals, a shell rotatably mounted on said handle and provided with an opening on the side thereof to receive and support said current conductors and a flexible cord protector surrounding said conductors and projecting from said opening in said shell, said shell being mounted for rotation about an axis such as to permit sidewise swivelling movement of the cord protector, whereby said cord protector protects said conductors against sharp bends by causing rotation of said shell when the appliance is placed on said stand and the lateral pull or drag of the conductors during the ironing operation is substantially reduced.

15. In a flatiron having a body, a handle grip and a handle support mounted upon said body, a hollow shell pivotally supported on said support for free relative oscillating movements about an axis extending generally lengthwise of said support but fixed against movements lengthwise of said axis, electric terminal means within said iron, said shell having an opening in the wall thereof, supply conductors connected with said terminals and extending therefrom through the opening in said wall for connection with a supply circuit, said shell being oscillatable by said conductors, whereby in the operation of ironing, the said shell, restricted by the drag of the conductors and having free relative pivoting movements on said axis, thereby minimizes destructive bending of said conductors.

16. In a flatiron having a body, a handle grip and a handle support mounted upon said body, a hollow shell pivotally supported on said support for free relative oscillating movements about an axis extending generally lengthwise of said support but fixed against movements lengthwise of said axis, means for limiting the oscillating movements of said shell, electric terminal means within said iron, said shell having an opening in the wall thereof, a flexible cord protector projecting outwardly from said opening, and supply conductors connected with said terminals and extending therefrom through said opening and said cord protector for connection with a supply circuit, said shell being oscillatable by said conductors and protector, whereby in the operation of ironing, the said shell, restricted by the drag of the conductors and having free relative pivoting movements on said axis, thereby minimizes destructive bending of said conductors.

17. In a flatiron having a body, a handle grip and a handle support mounted upon said body, a hollow shell pivotally supported on said support for limited relative oscillating movements about an axis extending generally lengthwise of said support but fixed against movements lengthwise of said axis, electric terminal means within said iron, said shell having an opening in the wall thereof, a flexible cord protector projecting outwardly from said opening, and supply conductors connected with said terminals and extending therefrom through said opening and said cord protector for connection with a supply circuit, including strain relief means within said shell engaged by said conductors, whereby in the operation of ironing, the said shell, restricted by the drag of the conductors and having free relative pivoting movements on said axis, thereby minimizes destructive bending of said conductors.

18. A flatiron structure having a body, a handle grip and a leg support therefor mounted upon the body, electrical terminal means within said iron and means protecting supply conductors entering said iron and connected with said electrical terminal means against destructive bending at the point of exit from or entrance into the iron and reducing the drag or pull of the conductors, comprising a member disposed at the entrance into the iron and mounted for sidewise oscillating movements and operatively engaging and supporting said supply conductors at their point of entrance into the iron, said oscillating member being oscillatable by the pull or drag of said conductors to vary the angle the conductors at this point of entrance into the iron make with the fore and aft axis of the iron, whereby in the operation of ironing said oscillating member, restricted by the drag of the conductors and having free relative pivoting movements, thereby minimizes destructive bending of said conductors and reduces the drag or pull of the latter during the ironing operation.

19. A flatiron structure having a body, a handle grip and a leg support therefor mounted upon the body, electrical terminal means within said iron and means protecting supply conductors entering said iron and connected with said electrical terminal means against destructive bending at the point of exit from or entrance into the iron, and reducing the drag or pull of the conductors comprising a member disposed at the entrance into the iron and mounted for sidewise oscillating movements and operatively engaging and supporting said supply conductors at their point of entrance into the iron, means for limiting the oscillating movements of said member, said oscillating member being oscillatable by the pull or drag of said conductors to vary the angle the conductors at this point of entrance into the iron make with the fore and aft axis of the iron, and strain relief means engaging said conductors whereby in the operation of ironing said oscillating member restricted by the drag of the conductors and having free relative pivoting movements, thereby minimizes destructive bending of said conductors and reduces the drag or pull of the latter during the ironing operation.

20. A flatiron having a body, a handle grip and a leg support therefor mounted upon the body, electrical terminal means within said iron and means protecting supply conductors entering said iron and connected with said electrical terminal means against destructive bending at the point of exit from or entrance into the iron and reducing the drag or pull of the conductors, comprising a member swivelled on said handle support for sidewise relative oscillating movements about an axis extending generally lengthwise of said support but fixed against movements lengthwise of said axis, said member operatively engaging the supply conductors at their entrance into the iron to be oscillated thereby, whereby in the operation of ironing, the swivel member restricted by the drag of the conductors and having free relative pivoting movements, thereby minimizes destructive bending of said conductors.

STUART D. BROWNLEE.
JOHN G. MACDONALD.